April 15, 1958   W. C. WOOTTON   2,830,350
FASTENING DEVICE
Filed June 29, 1954
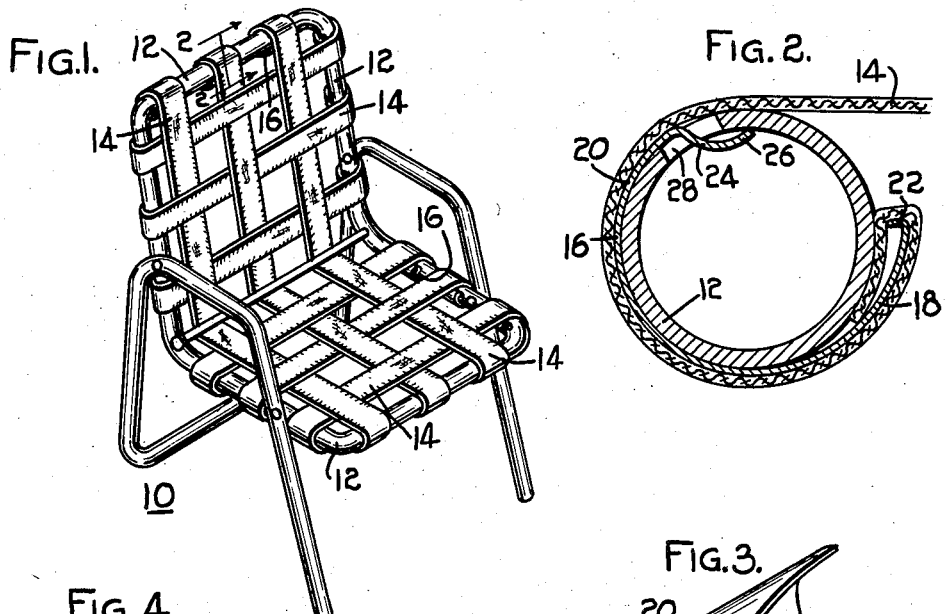
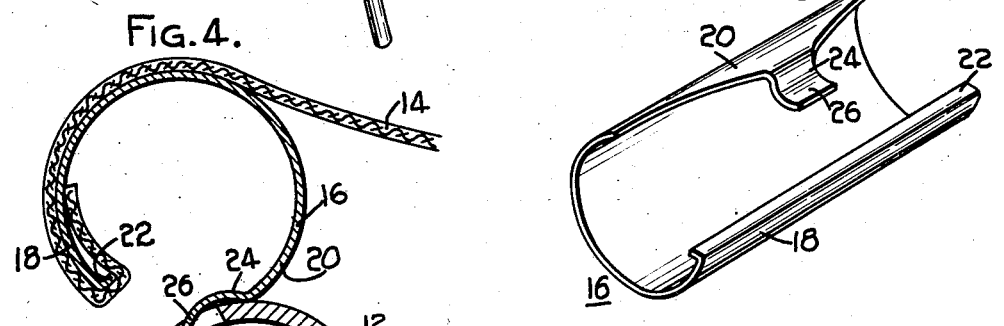
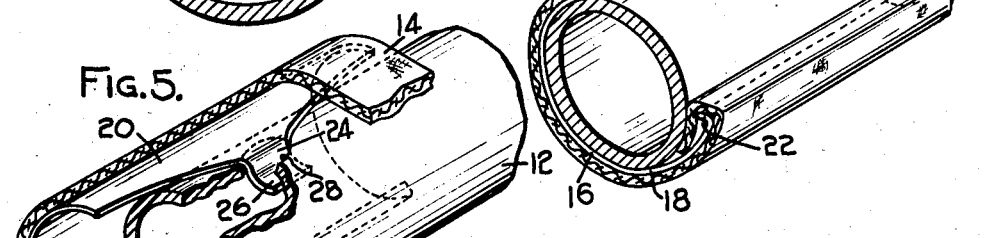
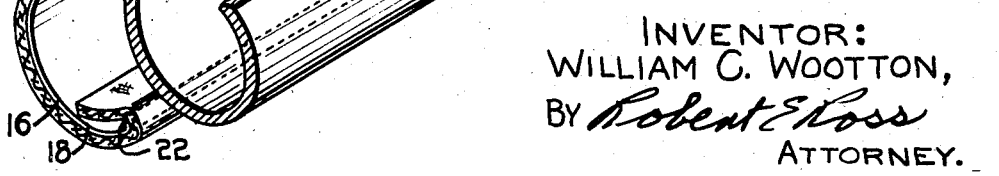
INVENTOR:
WILLIAM C. WOOTTON,
BY Robert E Ross
ATTORNEY.

United States Patent Office 2,830,350
Patented Apr. 15, 1958

2,830,350
FASTENING DEVICE

William C. Wootton, Centerville, Calif., assignor, by mesne assignments, to United-Carr Fastener Corporation, Boston, Mass., a corporation of Delaware Application June 29, 1954, Serial No. 440,089

2 Claims. (Cl. 24—259)

This invention relates generally to fastening devices, and has particular reference to a spring clip for securing a strap to a tubular member.

In the construction of certain types of furniture, the frame portion is formed of tubular members, and the seat and back portions are formed of criss-crossed straps, formed of a material such as cloth or plastic webbing, which extend between opposite portions of the frame. Each end of each strap must be securely attached to the tubular members, and for this purpose a number of various methods have been used. However, the methods now in use each have disadvantages, in that they require so large an aperture that they weaken the frame or are too difficult to apply or do not provide as strong an attachment as is desirable.

The object of this invention is to provide a spring clip fastening device for rapidly and easily securing a strap to a tubular member.

A further object of the invention is to provide a fastening device for attaching a strap to a tubular member which requires only a small aperture in the tubular member.

A further object of the invention is to provide a spring clip fastening device for securing a strap to a tubular member, which is of generally semi-circular configuration for snapping around the tubular member and having means disposed thereon for projecting into a wall opening in the tubular member.

Other objects of the invention will, in part, be obvious, and will, in part, appear hereinafter.

In the drawing:

Fig. 1 is a perspective view of an article of furniture embodying the features of the invention;

Fig. 2 is a section taken on line 2—2 of Fig. 1;

Fig. 3 is a perspective view of a spring clip fastening device embodying the features of the invention;

Fig. 4 is a view in section illustrating the first step in assembling a clip and strap to a tubular member by means of the fastener of Fig. 3;

Fig. 5 is a perspective view showing the second step in attaching the strap to the tubular member; and Fig. 6 is a view similar to Fig. 5 after completion of the assembly operation.

Referring to the drawing, there is illustrated an article of furniture 10, which has a frame formed of tubular members 12, and seat and back rest portions formed by straps 14 which extend between opposite portions of the frame and have end portions secured to the tubular members by spring clips 16.

In the illustrated embodiment, the spring clip 16 is formed of resilient sheet metal of generally semi-circular configuration so as to have opposing end portions 18 and 20.

To provide means for gripping the strap in a manner to appear hereinafter, the end portion 18 is provided with an inwardly turned end flange 22, and to provide means for engagement in a wall opening of the tubular member, a tongue 24 is provided on the end portion 20 which extends generally circumferentially therefrom and is inclined radially inwardly with a free end 26 turned radially outwardly for a purpose to appear hereinafter.

To assemble a strap and spring clip onto a tubular member, the end portion of the strap is folded over the end 18 of the clip, so that the end of the strap is disposed inside the clip. The strap is then wrapped around the outside of the clip, and the clip placed in position above the tubular member, so that the outwardly extending free end 26 of the tongue 24 extends into position for entering a suitably positioned opening 28 in the tubular member (see Fig. 4). The strap is then held in position on the clip while it is rotated around the tubular member, until the flange 22 forces the strap against the tubular member, and the clip snaps into position encircling the tubular member. The diameter of the clip is slightly less than that of the tubular member, so that after assembly the clip grips the tubular member tightly and a transverse portion of the strap is gripped by the flange 22 to resist tensile forces applied to the strap.

The strap assembly may then be completed by securing the other end thereof to the opposite portion of the tubular member by means of another clip, in the manner previously described.

Although other shapes of tongues may be used, the form illustrated facilitates entry of the tongue into the wall opening of the tubular member, particularly during the assembly of the second end of the strap, when the strap is being pulled tight, and the tongue thereafter acts as a dowel to prevent rotation of the clip around the tubular member.

Since certain obvious modifications may be made in the device without departing from the scope of the invention, it is intended that all matter contained herein be interpreted in an illustrative and not in a limiting sense.

I claim:

1. The combination of a fastening device, a strap and a tubular member having an aperture, said tubular member being adapted for applications of the class described, said fastening device being formed of resilient sheet metal and comprising a semicylindrical body portion having a diameter less than that of the tubular member and being engaged about the tubular member, said body portion having strap-gripping means at one end projecting radially inwardly toward the tubular member and bearing against the strap so that it is gripped between said strap-gripping means and the tube, and tube-engaging means adjacent to the other end of the body portion and adapted to enter said aperture in the tubular member thereby engaging the tubular member and holding the parts of the application in assembly, the said fastening device being entirely concealed by said strap.

2. The combination of a fastening device, a strap and a tubular member having an aperture, said tubular member being adapted for applications of the class described, said fastening device being formed of resilient sheet metal and comprising a semicylindrical body portion having a diameter less than that of the tubular member and being engaged about the tubular member, said body portion having strap-gripping means at one end projecting radially inwardly toward the tubular member and bearing against the strap so that it is gripped between said strap-gripping means and the tube, and tube-engaging means adjacent to the other end of the body portion and adapted to enter said aperture in the tubular member thereby engaging the tubular member and holding the parts of the application in assembly, one end of said strap being wrapped around the end of the fastening device at the strap-gripping means and then extending around the tube in the direction of the fastener and covering the fastener to assist the fastener in holding the strap to the tubular member.

References Cited in the file of this patent

UNITED STATES PATENTS

| | | |
|---|---|---|
| 564,573 | Hartshorn | July 21, 1896 |
| 1,462,171 | Greninger | July 17, 1923 |
| 1,492,736 | Metzger | May 6, 1924 |
| 1,609,240 | Brown | Nov. 30, 1936 |
| 2,582,579 | Bedford | Jan. 5, 1952 |

FOREIGN PATENTS

| | | |
|---|---|---|
| 327,163 | France | 1903 |